(12) United States Patent
Keum (10) Patent No.: US 11,450,930 B2
(45) Date of Patent: Sep. 20, 2022

(54) BATTERY MODULE AND BATTERY PACK HAVING SAME

(71) Applicant: LG CHEM, LTD., Seoul (KR)

(72) Inventor: Jong Yoon Keum, Chungcheongbuk-Do (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 16/754,187

(22) PCT Filed: Oct. 12, 2018

(86) PCT No.: PCT/KR2018/012064
§ 371 (c)(1),
(2) Date: Apr. 7, 2020

(87) PCT Pub. No.: WO2019/078553
PCT Pub. Date: Apr. 25, 2019

(65) Prior Publication Data
US 2021/0194100 A1    Jun. 24, 2021

(30) Foreign Application Priority Data
Oct. 16, 2017    (KR) ......................... 10-2017-0134145

(51) Int. Cl.
*H01M 50/507* (2021.01)
*H01M 50/509* (2021.01)
*H01M 50/548* (2021.01)

(52) U.S. Cl.
CPC ....... *H01M 50/507* (2021.01); *H01M 50/509* (2021.01); *H01M 50/548* (2021.01)

(58) Field of Classification Search
CPC . H01M 50/507; H01M 50/509; H01M 50/548
See application file for complete search history.

(56) References Cited

U.S. PATENT DOCUMENTS

2009/0325049 A1* 12/2009 Niedzwiecki ......... H01M 50/20
429/100
2011/0129704 A1    6/2011 Han et al.
(Continued)

FOREIGN PATENT DOCUMENTS

| CN | 102255064 A | 11/2011 |
| CN | 202695601 U | 1/2013 |

(Continued)

OTHER PUBLICATIONS

Machine translation of WO 2015/105335A1 (translation obtained from www.espacenet.com). (Year: 2015).*
(Continued)

*Primary Examiner* — Gregg Cantelmo
(74) *Attorney, Agent, or Firm* — Morgan, Lewis & Bockius LLP (57) ABSTRACT

The present invention relates to a battery module and a battery pack including the same, and more particularly, to a battery module including busbars having the same shape and connected to a positive (+) electrode terminal and a negative (−) electrode terminal of each of a plurality of battery cells, and to a battery pack provided with a busbar connection part which electrically connects and couples the modules through the busbar in the same side surface part of each of the plurality of battery modules.

7 Claims, 4 Drawing Sheets

(56) References Cited

U.S. PATENT DOCUMENTS

| | | |
|---|---|---|
| 2011/0287298 A1 | 11/2011 | Park et al. |
| 2011/0293998 A1* | 12/2011 | Sato .................... H01M 50/20 429/159 |
| 2012/0082875 A1* | 4/2012 | Watanabe ......... H01M 10/6563 429/82 |
| 2012/0141852 A1* | 6/2012 | Eberhard ............ H01M 50/572 429/98 |
| 2012/0183838 A1 | 7/2012 | An et al. |
| 2012/0321936 A1 | 12/2012 | Song |
| 2013/0230761 A1 | 9/2013 | Okutani et al. |
| 2013/0236769 A1 | 9/2013 | Bang et al. |
| 2014/0065467 A1 | 3/2014 | Choi et al. |
| 2014/0255748 A1 | 9/2014 | Jan et al. |
| 2014/0322582 A1* | 10/2014 | Ruter .................... H01M 50/20 429/120 |
| 2015/0155543 A1 | 6/2015 | Favaretto |
| 2015/0255225 A1 | 9/2015 | Kusaba et al. |
| 2015/0325824 A1 | 11/2015 | Hasegawa et al. |
| 2017/0200927 A1 | 7/2017 | Hasegawa |
| 2018/0366711 A1* | 12/2018 | Igarashi .............. H01M 50/581 |
| 2019/0181400 A1* | 6/2019 | Nakasawa ............ H01M 50/30 |
| 2019/0379025 A1* | 12/2019 | Cano .................. H01M 50/502 |

FOREIGN PATENT DOCUMENTS

| | | | |
|---|---|---|---|
| CN | 205159439 U | 4/2016 | |
| CN | 106328846 A | 1/2017 | |
| CN | 206022468 U | 3/2017 | |
| CN | 206116506 U | 4/2017 | |
| JP | 2012-243514 A | 12/2012 | |
| JP | 2014-519153 A | 8/2014 | |
| JP | 2014-170613 A | 9/2014 | |
| JP | 2015-519684 A | 7/2015 | |
| JP | 2016091959 A * | 5/2016 | |
| JP | 2017-157509 A | 9/2017 | |
| KR | 10-2010-0134111 A | 12/2010 | |
| KR | 10-1108181 B1 | 1/2012 | |
| KR | 10-1201066 B1 | 11/2012 | |
| KR | 10-1233509 B1 | 2/2013 | |
| KR | 10-1283347 B1 | 7/2013 | |
| KR | 10-1426612 B1 | 8/2014 | |
| KR | 10-2015-0070241 A | 6/2015 | |
| KR | 10-2015-0084661 A | 7/2015 | |
| KR | 10-2017-0106933 A | 9/2017 | |
| WO | 2012/073399 A1 | 6/2012 | |
| WO | 2013/018151 A1 | 2/2013 | |
| WO | 2014/083600 A1 | 6/2014 | |
| WO | 2014/119287 A1 | 8/2014 | |
| WO | WO-2015105335 A1 * | 7/2015 | ............ H01M 2/105 |
| WO | WO-2018123573 A1 * | 7/2018 | .......... H01M 50/342 |

OTHER PUBLICATIONS

Extended European Search Report dated, Jun. 9, 2020 issued in corresponding European Patent Application No. 18867601.9.
First Office Action dated Feb. 8, 2021, issued in corresponding Japanese Patent Application No. 2020-504127.
International Search Report issued in corresponding International Patent Application No. PCT/KR2018/012064 dated Jan. 18, 2019.
First Office Action dated Nov. 25, 2021, issued in corresponding Chinese Patent Application No. 201880048995.5.

* cited by examiner

BATTERY MODULE AND BATTERY PACK HAVING SAME

TECHNICAL FIELD

The present invention relates to a battery module and a battery pack including the same, and more particularly, to a battery module including busbars having the same shape and connected to a positive (+) electrode terminal and a negative (−) electrode terminal of each of a plurality of battery cells, and to a battery pack provided with a busbar connection part which electrically connects and couples the modules through the busbar in the same side surface part of each of the plurality of battery modules.

BACKGROUND ART

Lithium secondary batteries, as unit cells constituting a battery pack, have flexibility to thereby have relatively free shapes, are lightweight, and also have excellent safety, and thus, the demand for the lithium secondary batteries increases as power sources for portable electronic apparatuses such as mobile phones, camcorders, and laptop computers, and the secondary batteries are being widely used for middle and large sized apparatuses such as automobiles and power storage devices.

Meanwhile, secondary batteries are classified according to the shape of the battery case. When the electrode assembly is embedded in a cylindrical or prismatic metal can, the secondary battery is classified into the cylindrical battery or the prismatic battery, and when the electrode assembly is embedded in a pouch-type case of an aluminum laminate sheet, the secondary battery is classified into the pouch-type battery.

In addition, an electrode assembly contained in the battery case is composed of a positive electrode, a negative electrode, and a separator inserted between the positive electrode and the negative electrode, and can be charged/discharged, and the cylindrical electrode assembly is formed in a jelly-roll type in which a positive electrode, a separator, and a negative electrode each having a long sheet shape are sequentially laminated and wound.

The aforementioned batteries are classified as one battery cell, and a plurality of battery cells are connected in series or in parallel to thereby form a single module, and when a plurality of such modules are connected, a single battery pack is formed.

The plurality of modules are electrically connected through a busbar, which will be described in more detail with reference to FIG. 1.

Figure 1:
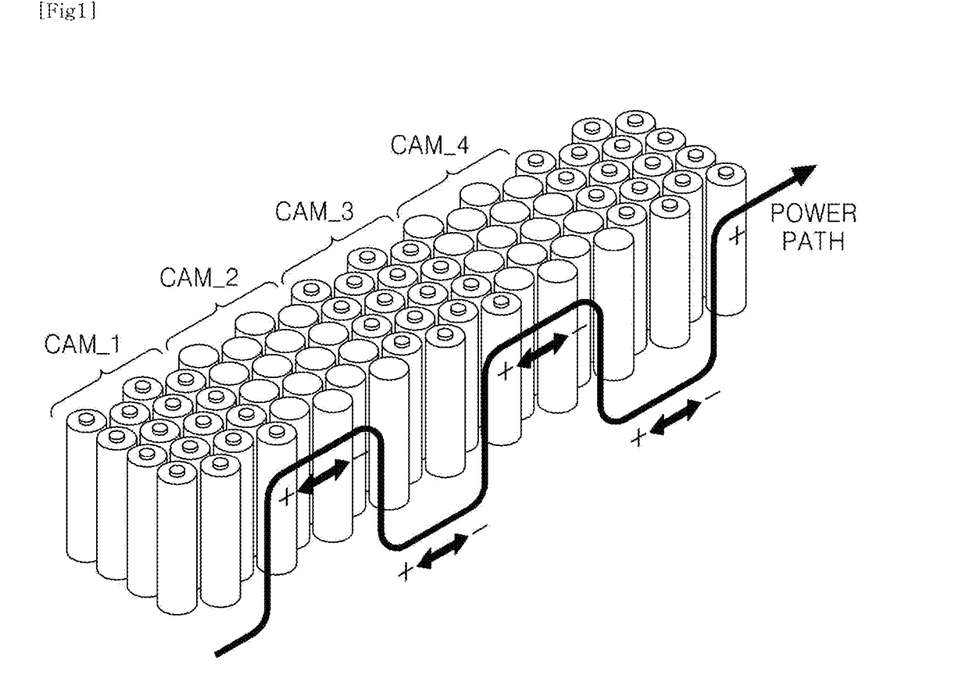
FIG. 1 is a structural view of a conventional battery pack.

FIG. 1 is a structural view of a conventional battery pack.

Referring to FIG. 1, in a conventional battery pack, in order to electrically connect battery modules to each other, electrodes of each module are disposed so as to be arranged alternately.

That is, in order to connect, in series, a plurality of battery modules in each of which a plurality of battery cells are connected in parallel, predetermined battery modules are rotated and electrically connected.

However, such work causes a problem in that since the battery modules are rotated, the efficiency of battery pack assembly is degraded, and the production time increases.

RELATED ART DOCUMENT

Patent Document (Patent document 1) KR2015-0084661 A

DISCLOSURE OF THE INVENTION

Technical Problem

The present invention provides a battery module quickly assembled with an enhanced efficiency of assembly and a battery pack including the same.

Technical Solution

In accordance with an exemplary embodiment, a battery module includes: a plurality of battery cells continuously arranged in the vertical direction to be adjacent to each other, and arranged such that positive (+) electrodes and negative (−) electrodes are arranged in the same direction; a module case configured to accommodate the plurality of battery cells; a positive electrode busbar provided with a positive electrode terminal coupling part disposed on one surface of the module case and configured to electrically connect the positive (+) electrodes of the battery cells adjacent to each other, and a positive electrode terminal extension part extending to be vertically bent from the positive electrode terminal coupling part; and a negative electrode busbar disposed on the other surface, of the module case, facing the positive electrode bus bar and configured to electrically connect the negative (−) electrodes of the battery cells adjacent to each other.

The negative electrode busbar may include: a negative electrode terminal coupling part to be in contact with the negative (−) electrode terminal of the battery cell; and a negative electrode terminal extension part extending to be vertically bent from the negative electrode terminal coupling part.

The positive electrode terminal extension part of the positive electrode busbar and the negative electrode terminal extension part of the negative electrode busbar may extend by a predetermined region to the same one side surface of the battery module and may be formed to be spaced apart from each other.

The module case may further include a busbar mounting groove formed to have a predetermined depth toward a body so that the positive electrode busbar and the negative electrode busbar are mounted on an outside of the case.

The positive electrode busbar and the negative electrode busbar may further include respective through holes at portions to be in contact with the plurality of battery cells.

In accordance with another exemplary embodiment, a battery pack is configured to include a plurality of modules including a plurality of battery cells, the battery pack including: a first battery module having a positive electrode busbar and a negative electrode busbar disposed to be spaced apart from each other on one side surface thereof; a second battery module having a positive electrode busbar and a negative electrode busbar disposed to be spaced apart from each other on one side surface thereof; and a busbar connection part configured to electrically connect the positive electrode busbar of the first battery module and the negative electrode busbar of the second battery module or the negative electrode busbar of the first battery module and the positive electrode busbar of the second battery module.

The positive electrode busbars of the first battery module and the second battery module may each include: a positive electrode coupling part disposed on one surface of a module case, which accommodates the plurality of battery cells, and configured to electrically connect the positive (+) electrodes of the battery cells adjacent to each other; and a positive electrode terminal extension part extending to be vertically bent from the positive electrode coupling part, and the negative electrode busbar may each be disposed on the other surface, of the module case facing the positive electrode busbar and configured to include: a negative electrode coupling part configured to electrically connect the negative (+) electrodes of the battery cells adjacent to each other; and a negative electrode terminal extension part extending to be vertically bent from the negative electrode coupling part, wherein the busbar connection part may be connected by contacting the positive electrode extension part of the positive electrode busbar and the negative electrode extension part of the negative electrode busbar.

The positive electrode busbar and the negative electrode busbar of the first battery module and the positive electrode busbar and the negative electrode busbar of the second battery module may be positioned on respective side surfaces of each of the battery modules in the same direction.

The battery pack may further include: a lower case having an inner bottom surface formed in a plate-like shape and configured to accommodate therein the first battery module and the second battery module; and an upper case formed in a shape corresponding to the lower case and configured to cover upper portions of the first battery module and the second battery module.

The present invention provides a device including the battery pack.

Specifically, the device is formed in a structure having only one openable surface, so that the module configuration of the battery pack may easily be added or replaced.

Specific examples of the device include, but not limited to, laptop computers, tablet PCs, wearable electronic apparatuses, electric vehicles including electric vehicles (EVs), hybrid electric vehicles (HEVs), plug-in hybrid electric vehicles (PHEVs), etc, and power storage devices, and the like.

In addition, the structures of these devices and the method for manufacturing the same are well known by those skilled in the art, and thus, detailed description thereon will not be provided in this description.

Advantageous Effects

A battery module and a battery pack including the same in accordance with exemplary embodiments do not require separate module rotation for connection between modules, because a positive (+) electrode busbar and a negative (−) electrode busbar are positioned on the same side surface part and a plurality of battery modules are connected and coupled to each other in a single side surface direction, and thus, efficiency of assembly is enhanced and a battery pack can be quickly assembled.

MODE FOR CARRYING OUT THE INVENTION

Hereinafter with reference to the features disclosed in the accompanying drawings, exemplary embodiments of the present invention will be described in detail. However, the present invention is not restricted or limited by the exemplary embodiments. Rather, these embodiments are provided so that this disclosure will be thorough and complete, and will fully convey the scope of the present invention to those skilled in the art.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present invention. The terms of a singular form may include plural forms unless referred to the contrary.

Terms used in the present invention are selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Embodiment 1

Hereinafter, a battery module in accordance with an exemplary embodiment of the present invention will be described.

A battery module in accordance with an exemplary embodiment of the present invention can be quickly assembled by being configured to include a positive electrode busbar and a negative electrode busbar which have shapes arranged in one surface so that a plurality of battery modules are connected on a side surface.

Figure 2:
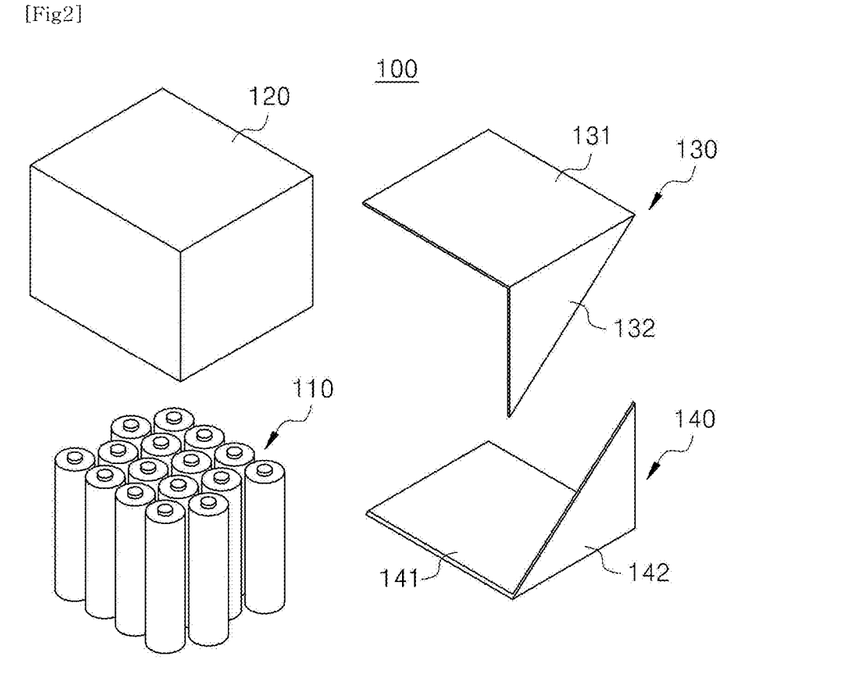
FIG. 2 is an exploded perspective view of a battery module in accordance with an exemplary embodiment.

FIG. 2 is an exploded perspective view of a battery module in accordance with an exemplary embodiment of the present invention.

Referring to FIG. 2, a battery module 100 in accordance with an exemplary embodiment of the present invention includes: a plurality of battery cells 110 which are continuously arranged in the vertical direction to be adjacent to each other have positive (+) electrodes and negative (−) electrodes arranged in the same direction; a module case 120 configured to accommodate the plurality of battery cells 110; a positive electrode busbar 130 provided with a positive electrode terminal coupling part 131 disposed on one surface of the module case 120 and configured to electrically connect the positive (+) electrodes of the battery cells adjacent to each other, and a positive electrode terminal extension part 132 extending to be vertically bent from the positive electrode terminal coupling part; and a negative electrode busbar 140 disposed on the other surface, of the module case, facing the positive electrode bus bar 130 and configured to electrically connect the negative (−) electrodes of the battery cells adjacent to each other.

In addition, similarly to the positive electrode busbar 130, the negative electrode busbar 140 includes: a negative electrode terminal coupling part 141 contacting the negative (−) electrode terminals of the battery cells; and a negative electrode terminal extension part 142 extending to be vertically bent from the negative electrode terminal coupling part 141.

The configuration of the battery module 100 will be described below in more detail.

The plurality of battery cells 110 are continuously arranged in the vertical direction to be adjacent to each other such that the positive (+) electrodes and the negative (−) electrodes are arranged in the same direction, and the positive (+) electrodes are formed on one surface of the battery module configured to include the plurality of battery cells 110 and the negative (−) electrodes are formed on the other surface.

As such, the electrode terminals of the battery module are disposed in one direction, and thus, the connection and coupling between the battery modules may easily be performed.

In addition, the battery cell 110 may be a cylindrical battery cell, but may be easily changed according to use.

In addition, the module case 120 is configured to accommodate the plurality of battery cells 110 therein, may be configured to hold the shape of the battery module by surrounding only side surfaces of the plurality of battery cells 110, or may also be configured to surround the entire surface of the plurality of battery cells and exposes only the electrode terminals of battery cells.

In addition, the module case 120 is further provided with, on the outer side thereof, a busbar mounting groove 121 having a predetermined depth toward the body so that the positive electrode busbar 130 and the negative electrode busbar 140 are mounted at regular positions, which will be described in more detail with reference to FIG. 3.

Figure 3:
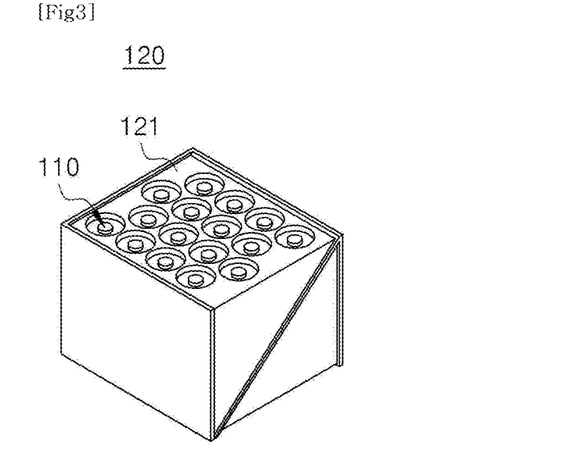
FIG. 3 is a perspective view of a module case inside a battery module in accordance with an exemplary embodiment.

FIG. 3 is a perspective view of a module case inside a battery module in accordance with an exemplary embodiment of the present invention.

Referring to FIG. 3, the busbar mounting groove 121 may be formed to have a depth corresponding to the thickness of the busbar so that when the busbar is disposed, the battery module has a flat shape.

In addition, when the positive electrode busbar 130 and the negative electrode busbar 140 are mounted in the busbar mounting groove 121, the positive electrode busbar 130 and the negative electrode busbar 140 can easily be positioned to be spaced from each other without a separate operation.

In addition, the positive electrode busbar 130 is disposed on one surface of the module case 120 and is configured to include: the positive electrode coupling part 131 configured to electrically connect the positive (+) electrodes of the battery cells adjacent to each other; and the positive electrode terminal extension part 132 extending to be vertically bent from the positive electrode coupling part. The negative electrode busbar 140 is disposed on the other surface, of the module case 120, facing the positive electrode busbar 130 and is configured to include: the negative electrode coupling part 141 configured to electrically connect the negative (+) electrodes of the battery cells adjacent to each other; and the negative electrode terminal extension part 142 extending to be vertically bent from the negative electrode coupling part.

The positive electrode coupling part 131 and the negative electrode coupling part 141 will be described in more detail with reference to FIG. 4.

Figure 4:
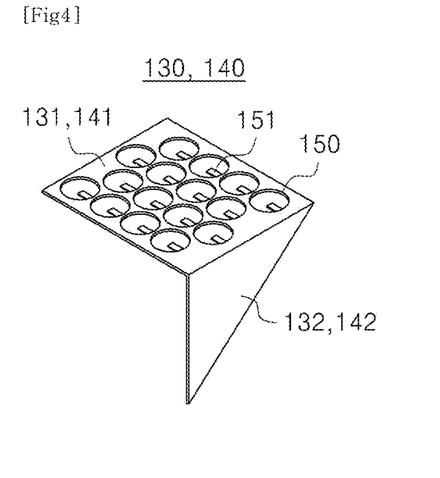
FIG. 4 is a perspective view of a positive electrode busbar and a negative electrode busbar inside a battery module in accordance with an exemplary embodiment.

FIG. 4 is a perspective view of a positive electrode busbar and a negative electrode busbar inside a battery module in accordance with an exemplary embodiment of the present invention.

The positive electrode busbar and the negative electrode busbar are formed in the same shape and thus will be described as a single shape.

Referring to FIG. 4, the positive electrode coupling part 131 and the negative electrode coupling part 141 are configured to contact the respective electrode terminals of the plurality of battery cells and respectively form a positive (+) electrode and a negative (−) electrode of thereof, and are formed of an electrically conductive material and may thereby be electrically connected.

In addition, the positive electrode coupling part 131 and the negative electrode coupling part 141 are formed in a singly plate-like shape and are allowed to cover the upper/lower portions of the battery module, or as shown in FIG. 4, may be formed in a shape in which through holes are respectively formed at respective portions to be in contact with the battery cells.

Here, the through holes 150 are formed so that gas generated in the battery cells due to various factors may be discharged to the outside of the battery module. This configuration prevents the damage to the battery cells due to a pressure of gas accumulated in the battery module.

In addition, inside the positive electrode coupling part 131 and the negative electrode coupling part 141, cell terminal coupling parts 151 are further provided at portions to be in contact with the electrode terminals of the plurality of battery cells and are allowed to be easily connected to the respective terminals of battery cells.

The cell terminal coupling parts 151 have elasticity and are formed in a shape extending to protrude from the respective positive electrode coupling part 131 and negative electrode coupling part 141 and may easily be in contact with the terminals of the respective battery cells even when the module case 120 is formed in a shape which surrounds the entire surface of the plurality of battery cells and only the electrode terminals are exposed.

In addition, the positive electrode extension part 132 and the negative electrode extension part 142 are configured to extend to be vertically bent from the positive electrode coupling part 131 and the negative electrode coupling part 141 which are to be in contact with the electrode terminals of the plurality of battery cells, and are formed on the same one side surface to be spaced apart from each other.

The positive electrode extension part 132 and the negative electrode extension part 142 perform electrical connection to another battery module, and thus are disposed on the same surface to allow the connection between the battery modules to be performed in one direction.

In addition, the positive electrode extension part 132 and the negative electrode extension part 142 may be formed in various shapes which ensure a predetermined region on the one side surface.

However, in order to quickly transmit the current of one battery module without a loss, it is efficient to secure a surface as wide as possible.

Accordingly, in the exemplary embodiment, one of side surfaces of the battery module is secured so as to perform the connection to another battery module with a surface as wide as possible.

Embodiment 2

Next, a battery pack in accordance with an exemplary embodiment of the present invention will be described.

A battery pack in accordance with an exemplary embodiment of the present invention is configured to include a busbar and a busbar connection part with which a plurality of battery modules can be connected and coupled on one side surface, and thus may allow the battery pack to be quickly assembled on one surface.

Figure 5:
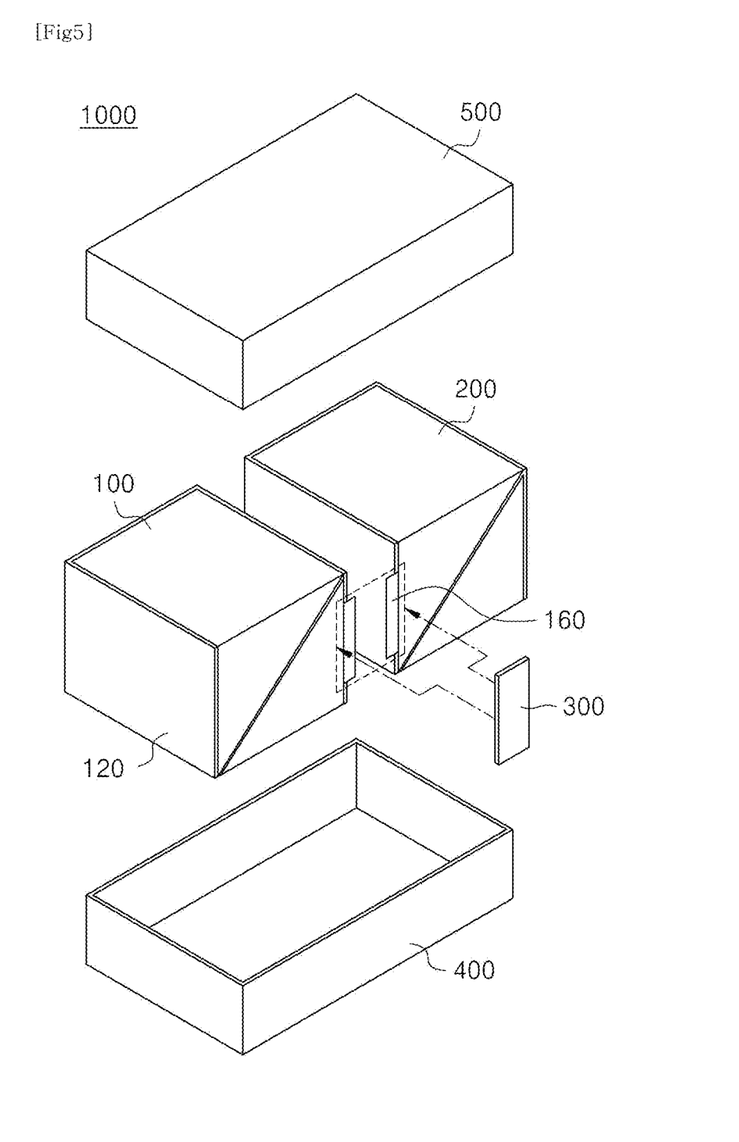
FIG. 5 is a perspective view of a battery pack in accordance with an exemplary embodiment.

FIG. 5 is a perspective view of a battery pack in accordance with an exemplary embodiment of the present invention.

Referring to FIG. 5, a battery pack 1000 in accordance with an exemplary embodiment of the present invention includes a plurality of modules each composed of a plurality of battery cells, and includes: a first battery module 100 having a positive electrode busbar and a negative electrode busbar disposed to be spaced apart from each other on one side surface thereof; a second battery module 200 having a positive electrode busbar and a negative electrode busbar disposed to be spaced apart from each other on one side surface thereof; and a busbar connection part 300 configured to electrically connect the positive electrode busbar of the first battery module and the negative electrode busbar of the second battery module or the negative electrode busbar of the first battery module and the positive electrode busbar of the second battery module.

Here, for the convenience of description, the battery pack is described as two battery modules, but a plurality of battery modules may be continuously connected in a column array.

Such a configuration of the battery pack 1000 will be described below in more detail.

In addition, the first battery module 100 and the second battery module 200 are configured to be disposed to be spaced apart from each other on one side surface, and in the side surface, on which the positive electrode busbar and the negative electrode busbar are disposed, the first battery module 100 and the second battery module 200 are formed on the same surface A. Here, surface A means one side surface inside the battery pack.

In addition, the first battery module 100 and the second battery module 200 are formed in the same configuration, and are configured to include, with reference to FIG. 2: a plurality of battery cells 110 disposed such that the positive (+) electrodes and the negative (−) electrodes are disposed in the same direction; a module case 120 configured to accommodate the plurality of battery cells 110; a positive electrode busbar 130 disposed on one surface of the module case 120 and configured to electrically connect the positive (+) electrodes of the battery cells adjacent to each other; and a negative electrode busbar 140 disposed on the other surface of the module case and configured to electrically connect the negative (−) electrodes of the battery cells adjacent to each other.

In addition, the positive electrode busbar 130 and the negative electrode busbar 140 will be described in more detail. The positive electrode busbar 130 is disposed on one surface of the module case 120 and is configured to include: a positive electrode coupling part 131 configured to electrically connect the positive (+) electrodes of the battery cells adjacent to each other; and a positive electrode terminal extension part 132 extending to be vertically bent from the positive electrode coupling part. The negative electrode busbar 140 is disposed on the other surface, of the module case, facing the positive electrode busbar 130 and is configured to include: a negative electrode coupling part 141 configured to electrically connect the negative (−) electrodes of the battery cells adjacent to each other; and a negative electrode terminal extension part 142 extending to be vertically bent from the negative electrode coupling part 141.

The positive electrode coupling part 131 and the negative electrode coupling part 141 contact the electrode terminals of the plurality of battery cells which form a single electrode and thus allow a positive (+) electrode to be formed on one surface of the battery module, and a negative (−) electrode to be formed on the other surface.

In addition, the positive electrode extension part 132 and the negative electrode extension part 142 are configured to extend to be vertically bent from the positive electrode coupling part 131 and the negative electrode coupling part 141 which are to be in contact with the electrode terminals of the plurality of battery cells, and are formed on the same one side surface to be spaced apart from each other.

Thus, the positive electrode extension part 132 and the negative electrode extension part 142 performs electrical connection to another battery module through the busbar connection part 300, and thus are disposed on the same surface to allow the connection between the battery modules to be performed in one direction.

In addition, the positive electrode extension part 132 and the negative electrode extension part 142 form side surface extension parts 160 spaced apart a predetermined distance from each other for connecting the busbar connection part 300, and allow the connection to the busbar connection part 300 to be performed on the side surface extension parts 160.

In addition, the busbar connection part 300 is configured to electrically connect the positive electrode busbar of the first battery module and the negative electrode busbar of the second battery module, or the negative electrode busbar of the first battery module and the positive electrode busbar of the second battery module, and more strictly speaking, the busbar connection part 300 is connected to side surface parts of the positive electrode terminal extension part 132 of the positive electrode busbar and the negative electrode terminal extension part 142 of the negative electrode busbar 142.

In addition, the busbar connection part 300 extends by the length of the side surface parts of the positive electrode terminal extension part 132 of the positive electrode busbar and the negative electrode terminal extension part 142 of the negative electrode busbar, and is connected to a predetermined range.

In addition, the busbar connection part 300 is formed of the same material as the positive/negative electrode busbars, reduces the loss of the current extracted from the battery module, and is connected by using ultrasonic welding, laser welding, etc. However, embodiments are not limited thereto, and the busbar connection part may be connected by using various materials, configurations, and connection methods.

In addition, the battery pack 1000 is configured to further include a lower case 400 and an upper case 500.

The lower case 400 accommodates therein the first battery module 100 and the second battery module 200, and the upper case 500 is formed in a shape corresponding to the lower case 400 and covers the upper portions of the first battery module 100 and the second battery module 200, and thus allows a single battery pack to be formed.

In addition, various connection types as well as bolts may be used for the connection between the lower case 400 and the upper case 500.

In addition, the lower case 400 is formed to have an inner bottom surface with a flat plate shape, so that the battery modules 100 and 200 may be disposed, and since the battery modules 100 and 200 are connected and coupled on one side surface, a separate configuration for electrical connection is not required on the bottom surface.

Thus, since the battery pack of an exemplary embodiment does not require a separate additional space and configuration for electrical connection, and the module extension can be performed on one side surface, the battery pack may be applied not only to an automobile that requires a large-capacity battery but also to various devices.

While the technical idea of the present invention has been specifically described with respect to the above embodiments, it should be noted that the foregoing embodiments are provided only for illustration while not limiting the present invention. In addition, a person with an ordinary skill in the technical field belonging to the present invention may carry out various embodiments within the scope of claims set forth herein.

DESCRIPTION OF SYMBOLS

100: Battery module, First battery module
110: Battery cell
120: Module case
121: Busbar mounting groove
130: Positive electrode busbar
131: Positive electrode terminal coupling part
132: Positive electrode terminal extension part
140: Negative electrode busbar
141: Negative electrode terminal coupling part
142: Negative electrode terminal extension part
150: Through hole
151: Cell terminal coupling part
160: Side surface extension part
200: Second battery module
300: Busbar connection part
400: Lower case
500: Upper case

What is claimed is:

1. A battery pack configured from a plurality of modules, the battery pack comprising:
    a first battery module having a first plurality of battery cells each vertically disposed therein, the first battery module comprising a positive electrode busbar including a positive electrode terminal extension part and a negative electrode busbar including a negative electrode terminal extension part, the positive and negative electrode terminal extension parts of the first battery module being spaced apart from each other on one side surface of the first battery module;
    a second battery module disposed in a horizontal direction adjacent to the first battery module and having a second plurality of battery cells each vertically disposed therein, the second battery module comprising a positive electrode busbar with a positive electrode terminal extension part and a negative electrode busbar including a negative electrode terminal extension part, the positive and negative electrode terminal extension parts of the second battery module being spaced apart from each other on one side surface of the second battery module; and
    a busbar connection part of an electrically conductive material and configured to electrically connect the positive electrode terminal extension part of the first battery module and the negative electrode terminal extension part of the second battery module,
    wherein the positive electrode extension part and the negative electrode extension part of each of the first and second battery modules respectively include a side surface extension part extended therefrom,
    wherein the side surface extension part of the positive electrode terminal extension part of the first battery module and the side surface extension part of the negative electrode terminal extension part of the second battery module are spaced apart a predetermined distance from each other with the busbar connection part configured to electrically connect the side surface extension part of the positive electrode terminal extension part of the first battery module and the side surface extension part the negative electrode terminal extension part of the second battery module in the horizontal direction,
    wherein the positive electrode extension part of the first battery module, the negative electrode extension part of the first battery module, the positive electrode extension part of the second battery module, the negative electrode extension part of the second battery module, and the busbar connection part all extend in a substantially same plane.

2. The battery pack of claim 1, wherein each of the positive electrode busbars of the first battery module and the second battery module further includes a positive electrode coupling part on one surface of a module case that accommodates the plurality of battery cells, and is configured to electrically connect the positive (+) electrodes of the battery cells adjacent to each other,
    wherein the positive electrode terminal extension part of each of the positive electrode busbars of the first battery module and the second battery module extends to be vertically bent from the respective positive electrode coupling part,
    wherein each of the negative electrode busbars of the first battery module and the second battery module is on another surface of the module case facing the positive electrode busbar and further includes a negative electrode coupling part configured to electrically connect the negative (−) electrodes of the battery cells adjacent to each other; and
    wherein the negative electrode terminal extension part of each of the negative electrode busbars of the first battery module and the second battery module extends to be vertically bent from the negative electrode coupling part.

3. The battery pack of claim 1, wherein the positive electrode busbar and the negative electrode busbar of the first battery module, and the positive electrode busbar and the negative electrode busbar of the second battery module are positioned on respective side surfaces of each of the first and second battery modules in the same direction.

4. The battery pack of claim 1, further comprising:
    a lower case having an inner bottom surface having a plate shape and configured to accommodate therein the first battery module and the second battery module; and
    an upper case having a shape corresponding to the lower case and configured to cover upper portions of the first battery module and the second battery module.

5. A device including a battery pack of claim 1.

6. The battery pack of claim 1, wherein, in each of the first and second battery modules, the positive electrode terminal extension part of the positive electrode busbar and the negative electrode terminal extension part of the negative electrode busbar each extend along a respective region of a same side surface of the battery module such that edges of the positive and negative electrode terminal extension parts are spaced apart from each other but are adjacent to each other to secure the same side surface.

7. The battery pack of claim 2, wherein, in each of the first and second battery modules, the positive electrode terminal extension part of the positive electrode busbar and the negative electrode terminal extension part of the negative electrode busbar each extend along a respective region of a same side surface of the battery module such that edges of the positive and negative electrode terminal extension parts are spaced apart from each other but are adjacent to each other to secure the same side surface.

\* \* \* \* \*